(12) United States Patent
Narendran et al.

(10) Patent No.: US 7,848,257 B1
(45) Date of Patent: Dec. 7, 2010

(54) SYNCHRONIZING RESERVATION STATUS BETWEEN AN ACCESS TERMINAL AND AN ACCESS NODE

(75) Inventors: Rajveen Narendran, Overland Park, KS (US); Andrew M. Wurtenberger, Olathe, KS (US); Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 90 days.

(21) Appl. No.: 12/247,572

(22) Filed: Oct. 8, 2008

(51) Int. Cl.
*H04L 12/28* (2006.01)
(52) U.S. Cl. .................... 370/254; 370/389
(58) Field of Classification Search ........... None
See application file for complete search history.

(56) References Cited

U.S. PATENT DOCUMENTS

| | | | |
|---|---|---|---|
| 5,550,528 A * | 8/1996 | Offord et al. ............. | 340/146.2 |
| 6,515,999 B1 * | 2/2003 | Nagami et al. ............ | 370/409 |
| 6,889,041 B2 * | 5/2005 | Miyoshi et al. ........... | 455/423 |
| 2006/0171356 A1 * | 8/2006 | Gurelli et al. ............. | 370/329 |
| 2007/0071000 A1 * | 3/2007 | Ulupinar et al. .......... | 370/389 |
| 2008/0043679 A1 * | 2/2008 | Karlsson et al. .......... | 370/335 |

* cited by examiner

*Primary Examiner*—Robert W Wilson

(57) ABSTRACT

Methods and systems are provided for synchronizing reservation status between an access terminal and an access node. In one embodiment, an access terminal receives a report from an access node, the report reflecting a first set of reservations, wherein the first set is a set of reservations that the access node is maintaining with respect to communicating with the access terminal. In response to receiving the report, the access terminal compares the first set of reservations with a second set of reservations, wherein the second set is a set of reservations that the access terminal is maintaining with respect to communicating with the access node. Upon comparing the first set with the second set, the access terminal determines that the first set is not equal to the second set, and responsively sends one or more messages to the access node to cause the access node to modify the first set to match the second set.

21 Claims, 4 Drawing Sheets

SYNCHRONIZING RESERVATION STATUS BETWEEN AN ACCESS TERMINAL AND AN ACCESS NODE

BACKGROUND

1. Technical Field

The present disclosure relates to wireless communications, and, more particularly, to configuration of access nodes and access terminals in wireless communication systems.

2. Description of Related Art

Many people use mobile stations, such as cell phones and personal digital assistants, to communicate with cellular wireless networks, which typically provide communication services such as voice, text messaging, and packet-data communication. These mobile stations and networks typically communicate with each other over a radio frequency (RF) air interface according to a wireless protocol. Mobile stations typically conduct wireless communications with one or more base transceiver stations (BTSs), each of which are arranged to send communications to and receive communications from mobile stations over the RF air interface.

Each BTS (sometimes referred to as a Node-B) is in turn communicatively connected with a network entity known as a base station controller (BSC) (sometimes referred to as a radio network controller (RNC)), which controls one or more BTSs and acts as a conduit between the one or more BTSs and one or more switches or gateways, such as a mobile switching center (MSC) and/or a packet data serving node (PDSN). The one or more switches or gateways may then interface with one or more signaling and/or transport networks. For example, an MSC may interface with the well-known public switched telephone network (PSTN). As another example, a PDSN may interface with one or more core packet data networks and/or the global Internet. As such, mobile stations can typically communicate over the one or more signaling and/or transport networks from anywhere inside the coverage area of one or more BTSs, via the BTS(s), a BSC, and a switch or gateway such as an MSC and/or PDSN.

SUMMARY

Methods and systems are provided for synchronizing reservation status between an access terminal and an access node. In one aspect, an embodiment may take the form of a method. In accordance with the method, an access terminal receives a report from an access node, the report reflecting a first set of reservations, wherein the first set is a set of reservations that the access node is maintaining with respect to communicating with the access terminal. In response to receiving the report, the access terminal compares the first set of reservations with a second set of reservations, wherein the second set is a set of reservations that the access terminal is maintaining with respect to communicating with the access node. Upon comparing the first set with the second set, the access terminal determines that the first set is not equal to the second set, and responsively sends one or more messages to the access node to cause the access node to modify the first set to match the second set.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
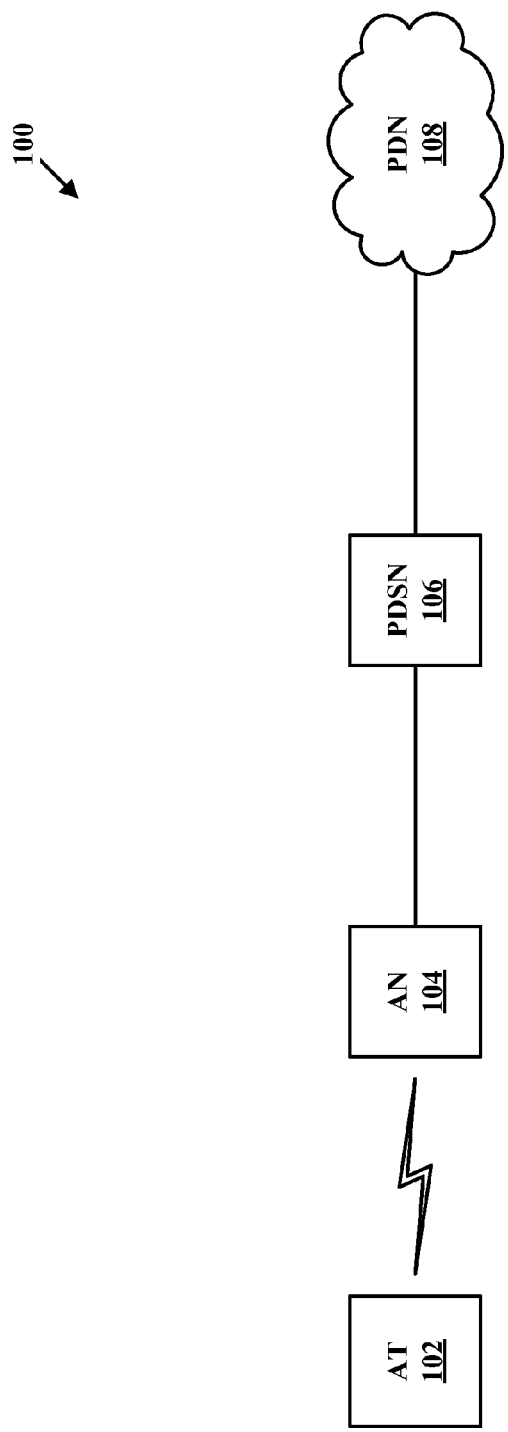
FIG. 1 is a simplified block diagram of a communication system, in accordance with exemplary embodiments.

As stated above, communications between a mobile station and one or more BTSs are typically conducted according to a wireless communication protocol. Some examples protocols are 1xRTT (Single Carrier Radio Transmission Technology) CDMA (Code Division Multiple Access), EV-DO (Evolution Data Optimized), WiMax (e.g. IEEE 802.16), WiFi (e.g. IEEE 802.11), GSM (Global System for Mobile Communications), etc. With respect to EV-DO in particular, mobile stations are typically referred to as access terminals, while RNCs (or perhaps combinations of an RNC and one or more BTSs) are typically referred to as access nodes.

In EV-DO, to initiate communication, an access terminal will undergo a negotiation process to set up a session with an access node. In general, in EV-DO, an access terminal that has a session with an access node can communicate via that access node with a PDSN and packet-data network to which the access node provides access, whereas an access terminal that does not have a session with an access node cannot communicate via that access node.

The process of an access terminal negotiating a session with an access node typically involves a number of steps, such as (a) the access terminal requesting and receiving a UATI (Universal Access Terminal Identifier) from the access node, (b) the access terminal requesting and receiving an air-interface connection (i.e. traffic channel) with the access node, (c) the access node validating that the access terminal is authorized to communicate via the access node, (d) the access node setting up a radio-packet (e.g., A10/A11) connection between the access node and a PDSN for the access terminal, (e) the access terminal and the PDSN negotiating to establish a data link (e.g., a point-to-point protocol (PPP) connection) therebetween, and (f) an entity such as the PDSN or a Mobile-IP home agent assigning an IP address to the access terminal.

In cases where the access terminal and the access node are operating in compliance with industry standard IS-856, Revision A, which is hereby incorporated herein by reference, session negotiation may also involve (g) the access terminal and the access node negotiating a set of profile IDs, which are identifiers associated in IS-856, Rev. A with types of packet-data communication (e.g. Voice over IP (VoIP), push-to-talk (PTT), best efforts, etc.), establishing the types of packet-data communication in which the access terminal can engage during the session and (h) the access terminal and the access node negotiating a set of personalities, which are essentially levels of QoS (Quality of Service) according to which the access terminal can engage during the session. And there may be other steps as well, and some steps mentioned herein may be left out, as this list is meant to be illustrative and not limiting.

Once session negotiation is complete, the access terminal has a session with the access node, and can therefore communicate over the packet-data network via the access node and the PDSN. Typically, the air-interface connection is then torn down, freeing up those resources for other access terminals. Both the network and the access terminal maintain data pertaining to the rest of what was established (i.e. pertaining to the negotiated session), however, including the IP address, radio-packet connection, and data link. This transition from having a traffic channel to not having one is referred to as the access terminal going from active to dormant.

Thereafter, if the access terminal wants to initiate communication, it sends another connection request to the access node, which then assigns a traffic channel to the access terminal. If, however, the access node receives data addressed to the access terminal, the access node typically sends a page to the access terminal over a paging channel, and assigns a traffic channel to the access terminal. The access terminal can then communicate over the packet-data network, using the IP address, radio-packet connection, data link, and newly-assigned traffic channel.

Moreover, when operating in compliance with IS-856, Rev. A, to make a reservation of resources with an access node for engaging in a particular packet flow (e.g. a VoIP or PTT call), an access terminal typically sends a message known as a ReservationOnRequest (i.e. an "On") to an access node. In general, reservations correspond with packet flows on a one-to-one basis, and, among other things, represent a Quality of Service (QoS) treatment to be applied to packets associated with that flow. Reservations are typically associated with an identifying designation called a Reservation Label. After a predefined period of inactivity (or perhaps after affirmative termination of a packet flow by a user of the access terminal or by an endpoint with which the access terminal is communicating), an access terminal typically sends a message known as a ReservationOffRequest (i.e. an "Off") to the access terminal, to release reserved resources.

Thus, in operation, an access terminal keeps track (i.e. maintains records in its data storage) of a set of reservations that it has open (i.e. that its records indicate that it has open) with the access node. The access terminal adds new reservations to the set in connection with sending Ons, and removes reservations from the set in connection with sending Offs. Correspondingly, the access node keeps track (i.e. maintains records in its data storage) of a set of reservations that it has open (i.e. that its records indicate that it has open) for one or more access terminals, on an access-terminal-by-access-terminal basis. For a given access terminal, the access node adds new reservations to the set in connection with receiving Ons, and removes reservations from the set in connection with receiving Offs.

In theory then, the set of reservations that a given access terminal is maintaining should always be consistent with the set of reservations that the access node is maintaining for that access terminal. This, however, is not always the case. Among possible causes for this inconsistency is that the access node does not receive Offs for all reservations that are no longer needed or in use by the access terminal. This can occur if the access terminal just does not send them, which can occur if a battery is abruptly removed, if the access terminal is placed in an airplane (i.e. non-wireless-communication) mode, or perhaps for some other reason. This can also occur if the access terminal sends Offs that are not received by the access node, which can occur due to poor air-interface conditions, or perhaps for some other reason.

Thus, it can occur that an access node is needlessly maintaining a number of reservations for which access terminals never had the chance to—or unsuccessfully tried to—send Offs. This can cause a number of undesirable effects. For a given access terminal, there may be constraints as to how many reservations the access terminal can have open (i.e. reservations for which the access terminal has sent an On but not yet an Off) with an access node at one time. If the access node is maintaining more reservations for the access terminal than the access terminal's records indicate, then subsequent requests from the access terminal may be refused, blocking that access terminal from engaging in packet flows that the access terminal's records indicate should be permitted. Furthermore, a given access terminal may send Ons for reservations that the access node is already maintaining; i.e. the access terminal may inefficiently and inaccurately send On messages for what are essentially duplicate reservations.

Moreover, an access node may have constraints has to how many reservations it can have open in total; as can be appreciated, the maintenance of reservations for which Offs should have been—or were unsuccessfully—sent could well result in illegitimate exhaustion of access-node resources, which may result in blocking of access terminals' attempts to open new reservations, even when those access terminals may have few (if any) reservations open at the time.

In accordance with the present disclosure, an access node is arranged to (e.g. periodically, e.g. once every fixed number of seconds) send to each access terminal for which it is currently maintaining a session a report indicating the set of reservations that the access node is currently maintaining for that access terminal. In one embodiment, the access node may use a message known as the ControlChannelDirected message to convey this information. In one embodiment, the access node may include the Reservation Labels for the reservations referenced in the report. The access terminal can then assess whether any actions are necessary to synchronize the set of reservations it is maintaining with the set of reservations that the access node is maintaining for it. Note that any set of reservations can include one or more reservations.

Thus, if an access terminal determines that there are one or more reservations in the set that the access terminal is maintaining that are not listed in the report received from the access node, the access terminal can send an On for each of those one or more reservations that were "missing" from the report. If, instead or in addition, the access terminal determines that there are one or more reservations listed in the report received from the access node that are not in the set that the access terminal is maintaining, then the access terminal can send an Off for each of those one or more "extra" reservations in the report. This process of notification and synchronization should address at least the problems discussed above, as well as others.

Note that it is also contemplated that the report may convey one or more parameters about one or more reservations, and that the access terminal could send one or more messages to modify the records of the access node to be consistent with those of the access terminal.

It is also contemplated that Ons and Offs may instead or in addition be sent from access nodes to access terminals, and that access terminals could periodically report to one or more access nodes the set of reservations that the access terminal is maintaining with the respective access node; note that all of the possibilities and permutations mentioned above with respect to the model where the access node periodically reports to the access terminal are explicitly contemplated with respect to this model as well. And many other possibilities exist as well.

And it should be noted that the above overview is intended to be illustrative and not limiting. Additional and/or different features may be present in some embodiments. And any description of an access terminal, access node, or other network element communicating or providing service according to IS-856, Rev. A is by way of example and not limitation; any suitable wireless protocol(s) may be used instead, such as CDMA, TDMA, AMPS, GSM, GPRS, UMTS, EDGE, WiMax (e.g. IEEE 802.16), LTE, microwave, satellite, MMDS, Wi-Fi (e.g. IEEE 802.11), Bluetooth, infrared, any later version or revision of IS-856, and/or any other now known or later developed.

2. Exemplary Architecture a. Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes an access terminal (AT) 102, an access node (AN) 104, a PDSN 106, and a packet-data network (PDN) 108. Note that additional entities not depicted in FIG. 1 could be present as well. As an example, there could be more than one access terminal in communication with access node 104; furthermore, there could be additional entities in communication with PDN 108. Also, there could be one or more devices and/or networks making up at least part of one or more of the communication links depicted in FIG. 1. As an example, there could be one or more routers, switches, or other devices or networks on the link between PDSN 106 and PDN 108.

Access terminal 102 may be any mobile device arranged to carry out the access-terminal functions described herein. As such, access terminal 102 may include a user interface, a wireless-communication interface, a processor, and data storage comprising instructions executable by the processor for carrying out those access-terminal functions. The user interface may include buttons, a touch-screen, a microphone, and/or any other elements for receiving inputs from users, as well as a speaker, one or more displays, and/or any other elements for communicating outputs to users.

The wireless-communication interface may comprise an antenna and a chipset for communicating with one or more access nodes over an air interface. As an example, the chipset could be one suitable for engaging in EV-DO communications. The chipset or wireless-communication interface in general may also be able to communicate with a 1xRTT CDMA network, a Wi-Fi (IEEE 802.11) network, and/or one or more additional types of wireless networks. The processor and data storage may be any suitable components known to those of skill in the art. As examples, access terminal 102 could be or include a cell phone, a PDA, a computer, a laptop computer, and/or a hybrid IS-2000/IS-856 device.

Access node 104 may be any one or any combination of network elements arranged to carry out the access-node functions described herein. As such, access node 104 may include a communication interface, a processor, and data storage comprising instructions executable by the processor to carry out those access-node functions. The communication interface may include one or more antennas and chipsets or other components for providing one or more EV-DO coverage areas such as cells or sectors, for communicating with access terminals such as access terminal 102 over an air interface. The communication interface may also include a wired packet-data interface such as an Ethernet interface for communicating directly or over one or more networks with PDSN 106. Access node 104 may include one or more base transceiver stations (BTSs) (or "Node-Bs"), as well as one or more radio network controllers (RNCs).

PDSN 106 may be any networking server or other device arranged to carry out the PDSN functions described herein. As such, PDSN 106 may include a communication interface, a processor, and data storage comprising instructions executable by the processor for carrying out those PDSN functions. The communication interface may include a wired packet-data interface such as an Ethernet interface for communicating with access node 104 and over PDN 108. Note that PDSN 106 may, instead or in addition, comprise a wireless-communication interface for communicating with PDSN 106 and over PDN 108. Note as well that PDSN 106 may use the same interface or separate interfaces for communicating with access node 104 and for communicating over PDN 108.

PDN 108 may include one or more wide area networks, one or more local area networks, one or more public networks such as the Internet, one or more private networks, one or more wired networks, one or more wireless networks, and/or one or more networks of any other variety. Devices in communication with PDN 108 may exchange data using a packet-switched protocol such as IP, and may be identified by an address such as an IP address.

3. Exemplary Operation a. A First Exemplary Method

Figure 2:
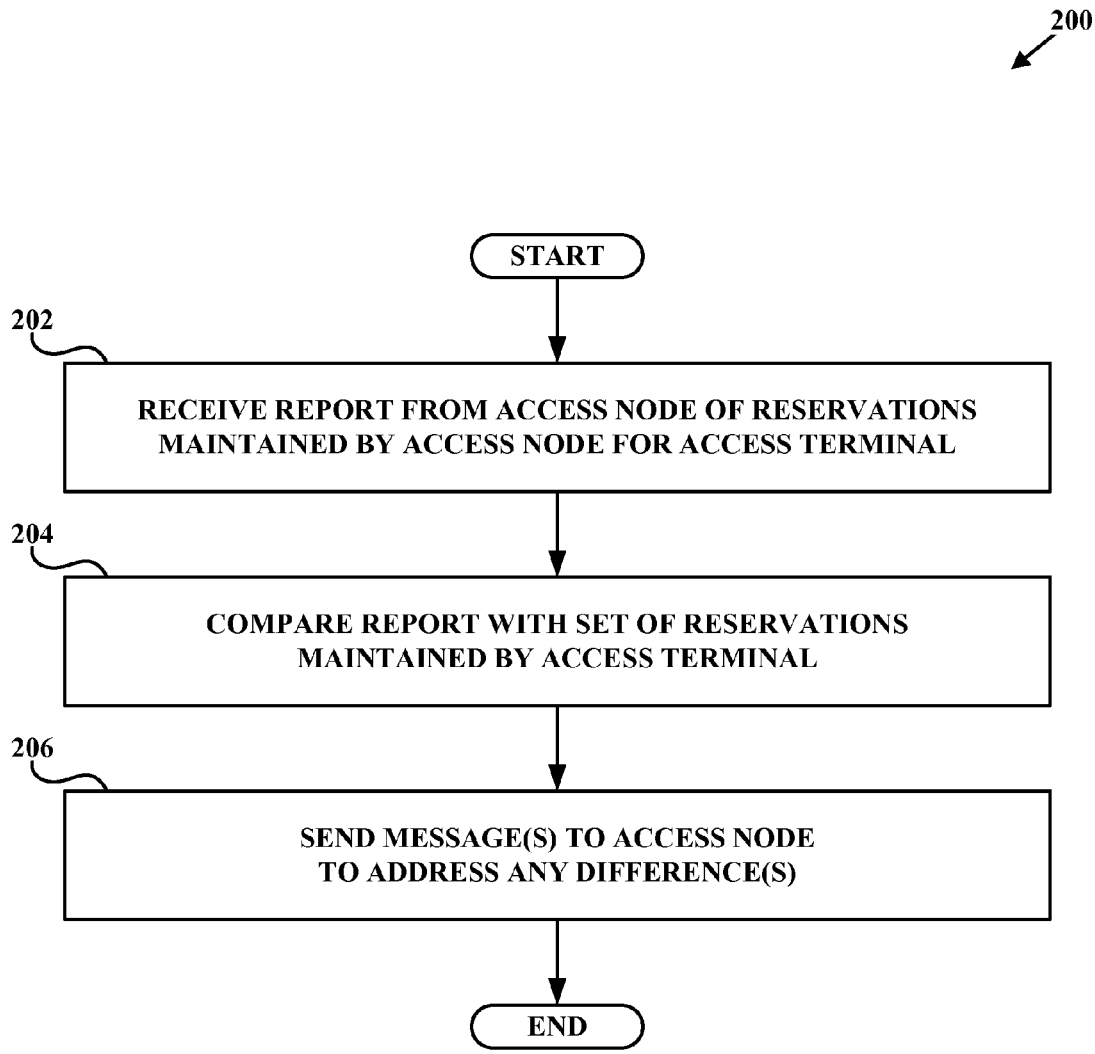
FIG. 2 is a flowchart of a method, in accordance with exemplary embodiments.

FIG. 2 depicts a flowchart of an exemplary method, in accordance with an exemplary embodiment. In some embodiments, as described below in connection with FIG. 2, method 200 may be carried out by an EV-DO access terminal, such as access terminal 102, which may operate in compliance with IS-856, Revision A, as may access node 104. In other embodiments, the method may be carried out by another network entity mentioned herein, some other network entity, or any combination thereof. In some embodiments the method may be carried out periodically, such as once every predetermined number (e.g. 5) of seconds.

As shown in FIG. 2, method 200 begins at step 202, when access terminal 102 receives a report from access node 104, perhaps in the form of or included in a ControlChannel-Directed message. The report reflects (e.g. lists) a first set of reservations, perhaps identifying them by reservation labels. These reservations, as well as those in the second set (referenced below) may correspond on a one-to-one basis with packet flows (e.g. IM sessions, PTT sessions, VoIP calls, etc.). And each reservation may correspond with a QoS treatment to be applied to packets associated with the corresponding packet flow.

The first set is a set of reservations that access node 104 is maintaining with respect to communicating with access terminal 102. Note that access node 104 maintaining the first set may involve access node 104 adding reservations to the first set upon receiving requests (e.g. ReservationOnRequest messages) from access terminal 102 to turn reservations on, as well as removing reservations from the first set upon receiving requests (e.g. ReservationOffRequest messages) from access terminal 102 to turn reservations off.

At step 204, in response to receiving the report in step 202, access terminal 102 compares the first set of reservations with a second set of reservations, where the second set is a set of reservations that access terminal 102 is maintaining with respect to communicating with access node 104. Note that access terminal 102 maintaining the second set may involve access terminal 102 adding reservations to the second set upon sending requests (e.g. ReservationOnRequest messages) to access node 104 to turn reservations on, as well as removing reservations from the second set upon sending requests (e.g. ReservationOffRequest messages) to access node 104 to turn reservations off.

At step 206, upon comparing the first set with the second set, access terminal 102 determines that the first set is not equal to the second set, and responsively sends one or more messages (e.g. one or more ReservationOnRequests and/or one or more ReservationOffRequests) to access node 104 to cause access node 104 to modify the first set to match the second set.

Determining that the first set is not equal to the second set may involve identifying a set of reservations that (a) are elements of the second set and (b) are not elements of the first set; in other words, these would be reservations that access terminal 102 thinks it has with access node 104, but which access node 104 is not maintaining. In this case, sending one or more messages to access node 104 to cause access node 104 to modify the first set to match the second set may involve sending one or more messages (e.g. ReservationOnRequest messages) to access node 104 to cause access node 104 to add the elements (i.e. reservations) of this identified set to the first set. In one embodiment, access terminal 102 may send a ReservationOnRequest message to access node 104 for each reservation in this identified set.

Determining that the first set is not equal to the second set may instead or in addition involve identifying a set of reservations that (a) are elements of the first set and (b) are not elements of the second set; in other words, these would be reservations that access terminal 102 is not maintaining with respect to communicating with access node 104 (e.g. reservations for which access terminal 102 sent a never-received Off message intended for access node 104), but which access node 104 is maintaining for access terminal 102. In this case, sending one or more messages to access node 104 to cause access node 104 to modify the first set to match the second set may involve sending one or more messages (e.g. ReservationOffRequest messages) to access node 104 to cause access node 104 to remove the elements (i.e. reservations) of this identified set from the first set. In one embodiment, access terminal 102 may send a ReservationOffRequest message to access node 104 for each reservation in this identified set.

In an embodiment, the report received in step 202 may include a value for a parameter of a reservation in the first set. In that case, access terminal 102 determining that the first set is not equal to the second set may involve access terminal 102 determining that the parameter has a different value for the reservation in the second set. Moreover, access terminal 102 sending one or more messages to access node 104 to cause access node 104 to modify the first set to match the second set may involve access terminal 102 sending the different value to access node 104.

b. A Second Exemplary Method

Figure 3:
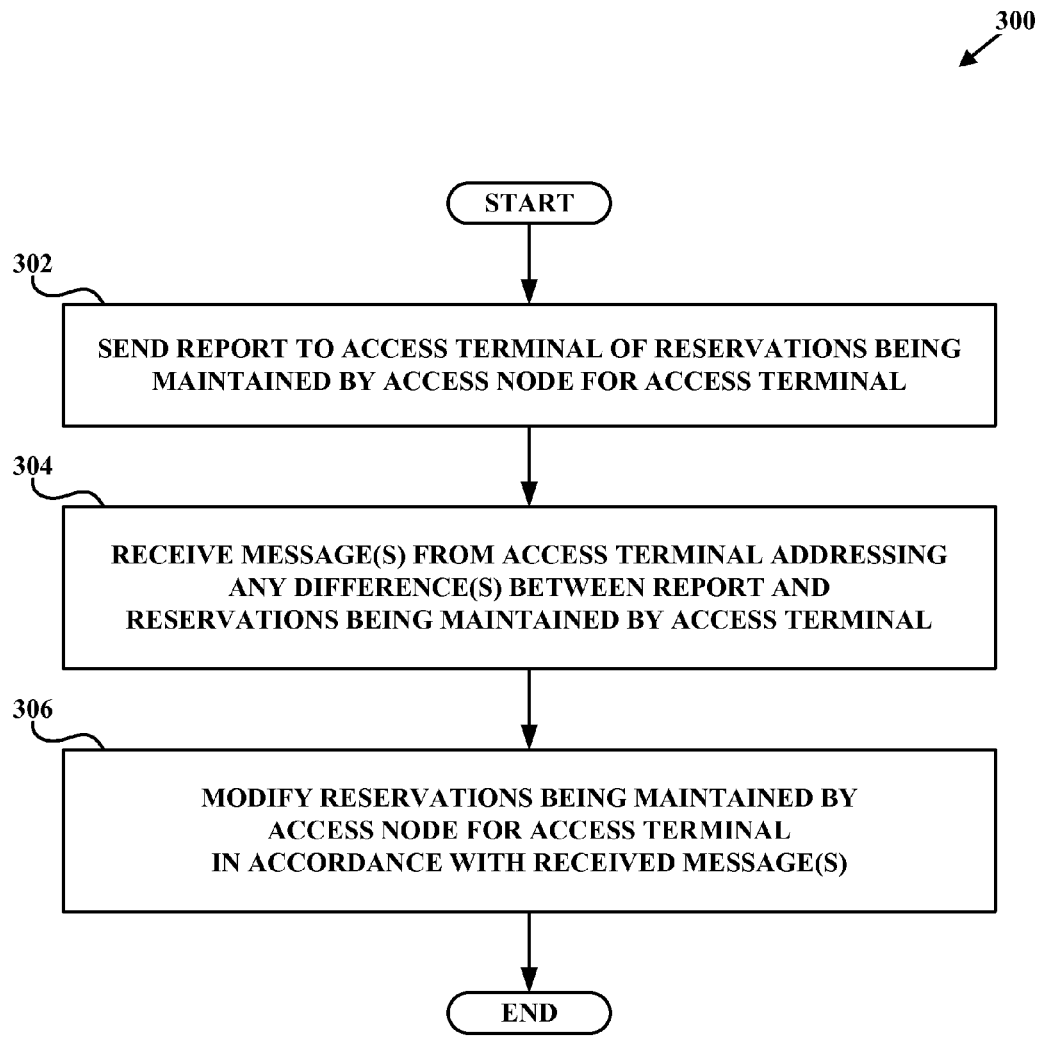
FIG. 3 is a flowchart of a method, in accordance with exemplary embodiments.

FIG. 3 is a flowchart of a second exemplary method, in accordance with an exemplary embodiment. In particular, FIG. 3 depicts a method 300, which may be carried out by an access node such as access node 104, which may operate in compliance with IS-856, Revision A, as may access terminal 102. In other embodiments, the method may be carried out by another network entity mentioned herein, some other network entity, or any combination thereof. In some embodiments the method may be carried out periodically, such as once every predetermined number (e.g. 5) of seconds. Method 300 is similar to method 200, and thus is not described in as great of detail.

As shown in FIG. 3, method 300 begins at step 302, when access node 104 sends a report to access terminal 102. The report reflects a first set of reservations, which is a set of reservations that access node 104 is maintaining with respect to communicating with access terminal 102.

At step 304, after sending the report, access node 104 receives one or more messages (e.g. one or more ReservationOnRequests and/or one or more ReservationOffRequests) from access terminal 102, where the one or more messages include one or more requests from access terminal 102 for access node 104 to modify the first set to match a second set of reservations. The second set of reservations is a set of reservations that access terminal 102 is maintaining with respect to communicating with access node 104. Note that, upon receiving the report, access terminal 102 compares the first set with the second set, determines that the first set is not equal to the second set, and responsively sends the one or more messages to access node 104.

At step 306, in response to receiving the one or more messages from access terminal 102 at step 304, access node 104 modifies the first set in accordance with the one or more requests. Note that carrying out step 306 may involve adding reservations to the first set in connection with receiving ReservationOnRequests; instead or in addition, carrying out step 306 may involve removing reservations from the first set in connection with receiving ReservationOffRequests. And other possibilities exist as well.

c. A Third Exemplary Method

Figure 4:
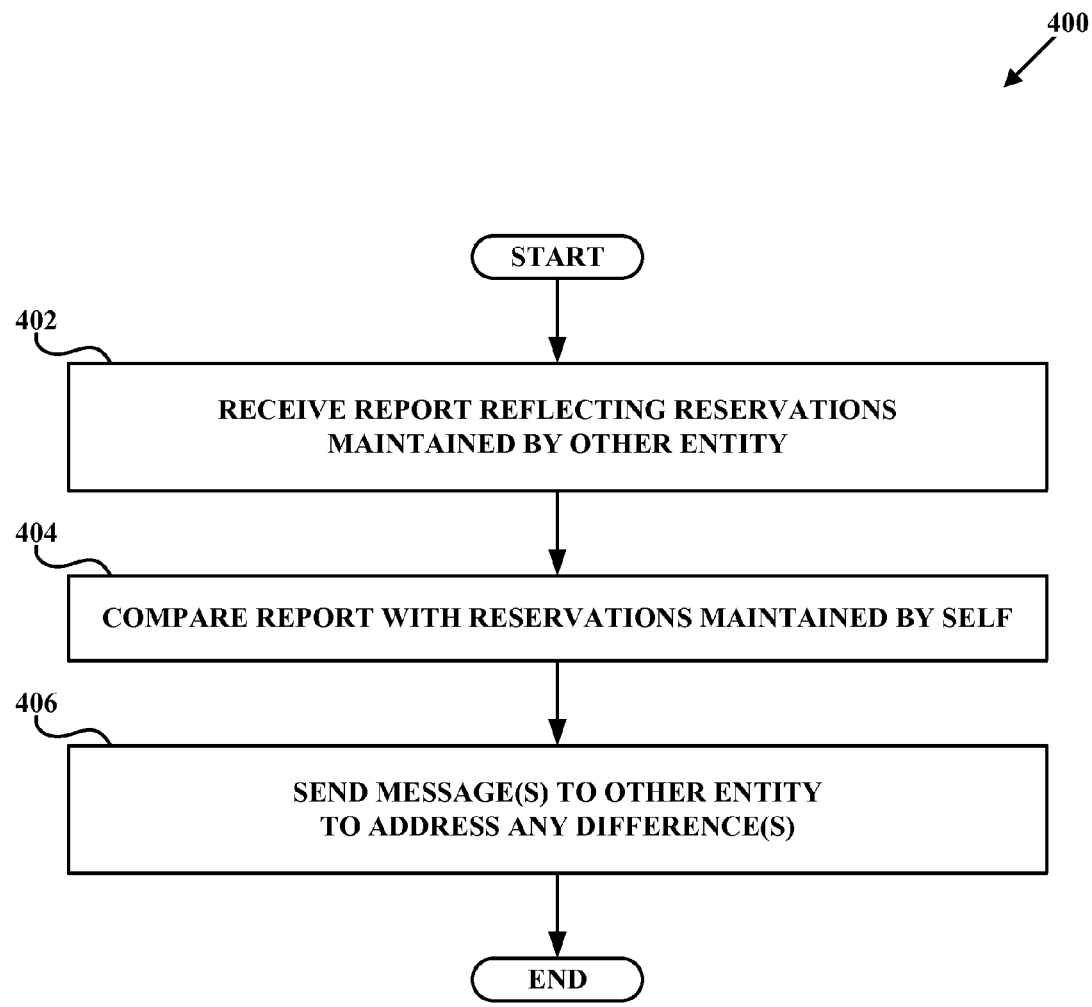
FIG. 4 is a flowchart of a method, in accordance with exemplary embodiments.

FIG. 4 is a flowchart of a third exemplary method, in accordance with an exemplary embodiment. In particular, FIG. 4 depicts a method 400, which may be carried out by an access terminal, such as access terminal 102, or by an access node, such as access node 104, both of which may operate in compliance with IS-856, Revision A. In some embodiments, the method may be carried out by another network entity mentioned herein, some other network entity, or any combination thereof. In some embodiments the method may be carried out periodically, such as once every predetermined number (e.g. 5) of seconds. Method 400 is similar to methods 200 and 300, and thus is not described in as great of detail.

As shown in FIG. 4, method 400 begins at step 402, when one of an access terminal and an access node receives a report from the other of the access terminal and the access node. The report reflects a first set of reservations, where the first set is a set of reservations that the other is maintaining with respect to communicating with the one. At step 404, in response to receiving the report, the one compares the first set of reservations with a second set of reservations, where the second set is a set of reservations that the one is maintaining with respect to communicating with the other. At step 406, upon comparing the first set with the second set, the one determines that the first set is not equal to the second set, and responsively sends one or more messages to the other to cause the other to modify the first set to match the second set.

4. Conclusion

Various exemplary embodiments have been described above. Those skilled in the art will understand, however, that changes and modifications may be made to those examples without departing from the scope of the claims.

The invention claimed is:

1. A method comprising:
    an access terminal receiving a report from an access node, the report reflecting a first set of reservations, wherein the first set is a set of reservations that the access node is maintaining in first data storage with respect to communicating with the access terminal, and wherein the reservations in the first set correspond on a one-to-one basis with packet flows;
    in response to receiving the report, the access terminal comparing the first set of reservations with a second set of reservations, wherein the second set is a set of reservations that the access terminal is maintaining in second data storage with respect to communicating with the access node, and wherein the reservations in the second set correspond on a one-to-one basis with packet flows;
    upon comparing the first set with the second set, the access terminal determining that the first set is not equal to the second set, and responsively sending one or more messages to the access node to cause the access node to modify the first set to match the second set; and
    in response to receiving the one or more messages from the access terminal, the access node modifying the first set to match the second set.

2. The method of claim 1, wherein the access terminal comprises at least one of a cellular telephone, a personal digital assistant, a computer, a laptop computer, a laptop air card, and a hybrid access terminal.

3. The method of claim 1, wherein the access node comprises a radio network controller.

4. The method of claim 3, wherein the access node further comprises one or more base transceiver stations.

5. The method of claim 1, wherein receiving the report comprises receiving a ControlChannelDirected message that comprises the report.

6. The method of claim 1, wherein the report comprises at least one reservation label corresponding to at least one reservation in the first set.

7. The method of claim 1, wherein maintaining the first set comprises (a) adding reservations to the first set upon receiving requests from the access terminal to turn reservations on and (b) removing reservations from the first set upon receiving requests from the access terminal to turn reservations off.

8. The method of claim 1, wherein maintaining the second set comprises (a) adding reservations to the second set upon sending requests to the access node to turn reservations on and (b) removing reservations from the second set upon sending requests to the access node to turn reservations off.

9. The method of claim 1, wherein each reservation corresponds with a Quality of Service (QoS) treatment to be applied to packets associated with the corresponding packet flow.

10. The method of claim 1, carried out periodically.

11. The method of claim 10, wherein periodically means once every predetermined number of seconds.

12. The method of claim 11, wherein the predetermined number is five.

13. The method of claim 1, wherein determining that the first set is not equal to the second set comprises identifying a third set of reservations, wherein the third set consists of reservations that (a) are elements of the second set and (b) are not elements of the first set, and wherein sending one or more messages to the access node to cause the access node to modify the first set to match the second set comprises sending one or more messages to the access node to cause the access node to add the elements of the third set to the first set.

14. The method of claim 13, wherein sending one or more messages to the access node to cause the access node to add the elements of the third set to the first set comprises sending a ReservationOnRequest message to the access node for each reservation in the third set.

15. The method of claim 1, wherein determining that the first set is not equal to the second set comprises identifying a third set of reservations, wherein the third set consists of reservations that (a) are elements of the first set and (b) are not elements of the second set, and wherein sending one or more messages to the access node to cause the access node to modify the first set to match the second set comprises sending one or more messages to the access node to cause the access node to remove the elements of the third set from the first set.

16. The method of claim 15, wherein sending one or more messages to the access node to cause the access node to remove the elements of the third set from the first set comprises sending a ReservationOffRequest message to the access node for each reservation in the third set.

17. The method of claim 1, wherein the report comprises a value for a parameter of a reservation in the first set, wherein determining that the first set is not equal to the second set comprises determining that the parameter has a different value for the reservation in the second set, and wherein sending one or more messages to the access node to cause the access node to modify the first set to match the second set comprises sending the different value to the access node.

18. A method comprising:
    an access node sending a report to an access terminal, the report reflecting a first set of reservations, wherein the first set is a set of reservations that the access node is maintaining in first data storage with respect to communicating with the access terminal, and wherein the reservations in the first set correspond on a one-to-one basis with packet flows;
    after sending the report, the access node receiving one or more messages from the access terminal, wherein the one or more messages comprise one or more requests from the access terminal for the access node to modify the first set to match a second set of reservations, wherein the second set is a set of reservations that the access terminal is maintaining in second data storage with respect to communicating with the access node, and wherein the reservations in the second set correspond on a one-to-one basis with packet flows, and wherein, upon receiving the report, the access terminal compares the first set with the second set, determines that the first set is not equal to the second set, and responsively sends the one or more messages to the access node; and
    in response to receiving the one or more messages from the access terminal, the access node modifying the first set in accordance with the one or more requests.

19. The method of claim 18, carried out periodically.

20. A method comprising:
    a first network element selected from the group consisting of an access terminal and an access node receiving a report from a second network element selected from the group consisting of the access terminal and the access node, wherein the first network element and the second network element are not the same, the report reflecting a first set of reservations, wherein the first set is a set of reservations that the second network element is maintaining in first data storage with respect to communicating with the first network element, and wherein the reservations in the first set correspond on a one-to-one basis with packet flows;

in response to receiving the report, the first network element comparing the first set of reservations with a second set of reservations, wherein the second set is a set of reservations that the first network element is maintaining in second data storage with respect to communicating with the second network element, and wherein the reservations in the second set correspond on a one-to-one basis with packet flows;

upon comparing the first set with the second set, the first network element determining that the first set is not equal to the second set, and responsively sending one or more messages to the second network element to cause the second network element to modify the first set to match the second set; and in response to receiving the one or more messages from the first network element, the second network element modifying the first set to match the second set.

21. The method of claim 20, carried out periodically.

\* \* \* \* \*